(12) United States Patent
Fukumoto et al.

(10) Patent No.: US 7,239,533 B2
(45) Date of Patent: Jul. 3, 2007

(54) DC POWER SUPPLY APPARATUS

(75) Inventors: Yukinari Fukumoto, Niiza (JP); Syohei Osaka, Niiza (JP); Toshirou Takeuchi, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 10/538,386

(22) PCT Filed: Nov. 28, 2003

(86) PCT No.: PCT/JP03/15241

§ 371 (c)(1),
(2), (4) Date: Jun. 13, 2005

(87) PCT Pub. No.: WO2004/054080

PCT Pub. Date: Jun. 24, 2004

(65) Prior Publication Data

US 2006/0113973 A1    Jun. 1, 2006

(30) Foreign Application Priority Data

Dec. 12, 2002    (JP) ............................ 2002-361212

(51) Int. Cl.
*H02M 3/335* (2006.01)
(52) U.S. Cl. ............................. 363/21.17; 363/21.09; 363/97
(58) Field of Classification Search ............ 363/21.09, 363/21.1, 21.17, 21.18, 95, 97
See application file for complete search history.

(56) References Cited

U.S. PATENT DOCUMENTS

| | | | | |
|---|---|---|---|---|
| 5,408,401 A * | 4/1995 | Miyazaki | .................. | 363/21.08 |
| 5,469,349 A * | 11/1995 | Marinus | .................. | 363/21.08 |
| 5,610,804 A * | 3/1997 | Shimizu | .................. | 363/21.16 |
| 5,612,858 A * | 3/1997 | Weinmeier et al. | ....... | 363/21.13 |
| 5,729,443 A * | 3/1998 | Pavlin | ...................... | 363/21.12 |
| RE37,221 E * | 6/2001 | Bowman et al. | .......... | 363/21.06 |
| 6,292,376 B1 * | 9/2001 | Kato | ........................ | 363/21.09 |
| 6,356,466 B1 * | 3/2002 | Smidt et al. | ............. | 363/21.17 |
| 6,381,152 B1 * | 4/2002 | Takahashi et al. | ........ | 363/21.06 |
| 6,525,947 B2 * | 2/2003 | Umetsu et al. | ........... | 363/21.15 |
| 6,639,812 B2 * | 10/2003 | Nakazawa et al. | ........ | 363/21.07 |

FOREIGN PATENT DOCUMENTS

| | | |
|---|---|---|
| JP | 62-46913 | 3/1987 |
| JP | 6217544 | 8/1994 |
| JP | 10225116 | 8/1998 |
| JP | 2000132248 | 5/2000 |
| JP | 2002006967 | 1/2002 |
| JP | 2002142452 | 5/2002 |

* cited by examiner

*Primary Examiner*—Jeffrey Sterrett
(74) *Attorney, Agent, or Firm*—Bachman & LaPointe, P.C.

(57) ABSTRACT

A DC power source device comprises a MOS-FET 5 which performs the intermittent switching operation for converting DC input from a DC power supply 1 into high frequency electric power; a control circuit 9 for turning MOS-FET 5 on and off; and a rectifying smoother 6 for converting the high frequency electric power through MOS-FET 5 into a DC power output supplied to a load 50. Control circuit 9 comprises an output current controller 11 for controlling the on-off term of MOS-FET 5 to make DC output current $I_O$ through load 50 settle toward a rated value $I_{OMAX}$; a shunt regulator 24 for receiving a drive current $I_{SH}$ supplied from rectifying smoother 6 and producing a reference voltage $V_{R1}$ to regulate the rated value $I_{OMAX}$ of output current controller 11; and a constant current source 32 for keeping drive current $I_{SH}$ on a substantially constant level under the rated output current value condition and reduced output voltage condition. Constant current source 32 functions to supply shunt regulator 24 with minimum drive current $I_{SH}$ to maintain reference voltage $V_{REF}$ on a constant level under the reduced output voltage, and also to control drive current $I_{SH}$ to shunt regulator 24 to a necessary but minimum level under the rated value of DC output current.

12 Claims, 7 Drawing Sheets

DC POWER SUPPLY APPARATUS

TECHNICAL FIELD

This invention relates to a DC power source device, in particular of the type for supplying necessary minimum drive current to a reference voltage source under the low output voltage condition such as the overloaded condition, and reducing the power consumption in the standby condition such as under the unloaded or light-loaded condition.

BACKGROUND OF THE INVENTION

Recently, energy saving in all electric products has been proposed in view of environmental protection, and in particular, it has become an important problem that recent power source devices should require reduction in power consumption during the standby condition. In addition, with increase of mobile electric equipments such as cellular phones late years, power source devices are necessary which have a chargeable battery and are safe under any loaded condition including an abnormal condition.

A prior art DC power source device shown in FIG. 6 comprises a primary winding 3 of a transformer 2 and a switching element or MOS-FET 5 connected in series to a DC power supply 1; a rectifying smoother 6 connected to a secondary winding 4 of transformer 2 for supplying DC output power to a load 50; and a control circuit 9 for controlling turning-on and -off of MOS-FET 5 in response to the level of DC output supplied to load 50. Rectifying smoother 6 comprises a rectifying diode 7 connected to secondary winding 4 and a smoothing capacitor 8 connected to rectifying diode 7 to supply DC output to load 50 through DC output terminals 29 and 30.

Control circuit 9 comprises a voltage stabilizer 10 for producing control signals of constant or regulated voltage to control the on-off period of MOS-FET 5 in order to make DC output voltage $V_O$ to load 50 stabilize to a constant value $V_2$; a current controller 11 for producing current control signals to control the on-off period of MOS-FET 5 in order to make DC output current $I_O$ settle on a constant value when DC output current $I_O$ supplied to load 50 exceeds a rated value $I_{OMAX}$; a shunt regulator 24 as a reference voltage generator for producing a reference voltage $V_{REF}$; a light emitter 26 of a photo-coupler 25 driven by logical sum signals of each output from voltage stabilizer 10 and current controller 11 for radiating a light output; a light receiver 27 of photo-coupler 25 for passing therethrough electric current the amount of which changes in proportion to an amount of light output radiated from light emitter 26; and a PWM controller 28 for supplying a gate terminal of MOS-FET 5 with drive signals $V_G$ of variable pulse width in response to the amount of electric current through light receiver 27 of photo-coupler 25. Shunt regulator 24 is driven by output current $I_{SH}$ from rectifying smoother 6 supplied through a bias resistor 23 to produce a reference voltage $V_{REF}$ for regulating a reference value of output voltage $V_O$. Shunt regulator 24 may comprise, for example, a well-known IC (integrated circuit) for reference voltage such as TL431. Resistance value of bias resistor 23 is determined to supply shunt regulator 24 with drive current $I_{SH}$ of a necessary minimum value when DC output voltage $V_O$ is of the constant value $V_2$. PWM controller 28 produces drive signals $V_G$ of wide and narrow pulse width when respectively small and large amount of electric current flows through light receiver 27 of photo-coupler 25.

Voltage stabilizer 10 comprises detective resistors 12 and 13 connected between output terminals of rectifying smoother 6 for dividing DC output voltage $V_O$ to load 50 into a desirable step-down level; and a voltage-controlling operational amplifier 14 which has an inverted input terminal for receiving a first divided voltage on a first junction between detective resistors 12 and 13 and a non-inverted input terminal for receiving a reference voltage $V_{REF}$ of shunt regulator 24. Voltage-controlling operational amplifier 14 compares divided voltage on junction between detective resistors 12 and 13 and reference voltage $V_{REF}$ of shunt regulator 24 to produce an error voltage between the divided and reference voltages as a control signal for constant voltage. Output terminal of voltage-controlling operational amplifier 14 is connected to light emitter 26 through a resistor 15 and a diode 16. Current controller 11 comprises a current detecting resistor 17 as an output current detection means connected to a negative output line of rectifying smoother 6 for detecting DC output current $I_O$ through load 50 as a voltage corresponding to output current $I_O$; parting resistors 18 and 19 connected to two terminals of shunt regulator 24 for dividing reference voltage $V_{REF}$ from shunt regulator 24 into a second divided voltage on second junction between parting resistors 18 and 19 so that the second divided voltage provides a reference voltage $V_{R1}$ for regulating the rated current value $I_{OMAX}$; and a current-controlling operational amplifier 20 which has a non-inverted terminal for receiving detection signals from current detecting resistor 17 and an inverted terminal for receiving reference voltage $V_{R1}$ on second junction between parting resisters 18 and 19. Output terminal of current-controlling operational amplifier 20 is connected to light emitter 26 through a resistor 21 and a diode 22. Current-controlling operational amplifier 20 compares detection signal from current detecting resistor 17 and reference voltage $V_{R1}$ to produce an error voltage therebetween as a constant current control signal. Voltage control operational amplifier 14 produces control signals for constant voltage which thereby causes electric current to flow through a resistor 15, a diode 16 and light emitter 26. Current control operational amplifier 20 produces control signals for constant current which thereby causes electric current to flow through a resistor 21, a diode 22 and light emitter 26. Optical output signals from light emitter 26 of photo-coupler 25 are controlled by a composite logical sum signal formed by constant voltage-current control signals from voltage and current control operational amplifiers 14 and 20.

Light emitter 26 of photo-coupler 25 produces a light output which is received by light receiver 27 to control electric current flowing through light receiver 27 to be proportional to an amount of light output from light emitter 26. PWM controller 28 modulates the pulse width of drive signals $V_G$ based on a value of electric current flowing through light receiver 27 of photo-coupler 25 and provides gate terminal of MOS-FET 5 with the pulse width-modulated drive signal $V_G$. Resistors 15, 21, diodes 16, 22, photo-coupler 25 and PWM controller 28 form a drive signal generator. In this way, control circuit 9 controls the on-off period of MOS-FET 5 in response to DC output voltage $V_O$ and DC output current $I_O$ supplied to load 50 to always supply such stabilized DC output to load 50.

In operation of the DC power source device shown in FIG. 6, PWM controller 28 of control circuit 9 forwards drive signals $V_G$ to gate terminal of MOS-FET 5 to alternately turn MOS-FET 5 on and off so that DC input voltage is applied from DC power supply 1 to primary winding 3 of transformer 2 and MOS-FET 5 to cause electric current of high frequency to run through primary winding 3 and MOS-FET 5. Electric current of high frequency through primary winding 3 induces on secondary winding 4 high frequency voltage which is then rectified and smoothed by rectifying diode 7 and smoothing capacitor 8 of rectifying smoother 6, and converted into DC output voltage $V_O$ to load 50 through DC output terminals 29, 30.

When DC output current $I_O$ equal to or less than a rated value $I_{OMAX}$ is supplied to load 50 through DC output terminals 29 and 30, voltage stabilizer 10 of control circuit 9 operates to control DC output voltage $V_O$ toward load 50 to a constant value $V_2$ as shown by a solid line A in FIG. 7. Under such a normal operating condition, DC output voltage $V_O$ between DC output terminals 29 and 30 is split to first junction voltage between detective resistors 12 and 13 so that voltage control operational amplifier 14 compares first junction voltage on the inverted input terminal with reference voltage $V_{REF}$ on the non-inverted input terminal from shunt regulator 24 to generate an error voltage between these compared voltages from output terminal of voltage control operational amplifier 14. Accordingly, when first junction voltage divided from DC output voltage $V_O$ is lower than reference voltage $V_{REF}$ from shunt regulator 24, voltage control operational amplifier 14 produces a positive error voltage to reduce an amount of light output from light emitter 26 of photo-coupler 25, decreasing electric current through light receiver 27. With declination of electric current through light receiver 27, PWM controller 28 operates to widen on-pulse width or time span of drive signals $V_G$ and provide them for MOS-FET 5 which therefore is turned on for a longer time. To the contrary, when first junction voltage of DC output voltage $V_O$ is greater than reference voltage $V_{REF}$ from shunt regulator 24, PWM controller 28 performs an opposite operation from the above-mentioned to shorten the on-period of MOS-FET 5. Thus, as shown by solid line A, DC output voltage $V_O$ can be adjusted toward a constant value $V_2$ to supply load 50 with DC output power of constant voltage through DC output terminals 29 and 30.

In case DC output current $I_O$ through load 50 is greater than rate value $V_{OMAX}$ as in the overloaded condition, current control circuit 11 of control circuit 9 operates to control DC output current $I_O$ to the constant rated value $I_{OMAX}$ as shown by solid line B in FIG. 7. Here, as DC output current $I_O$ toward load 50 flows through detecting resistor 17 which picks out DC output current $I_O$ as a corresponding voltage value thereto. On the other hand, parting resistors 18 and 19 split reference voltage $V_{REF}$ from shunt regulator 24 to produce on second junction between parting resistors 18 and 19 reference voltage $V_{R1}$ used to regulate DC output current $I_O$ toward the rated value $I_{OMAX}$. Sensed voltage by detecting resistor 17 is input to inverted input terminal of current control operational amplifier 20 which compares sensed voltage from detecting resistor 17 with reference voltage $V_{R1}$ on non-inverted terminal of operational amplifier 20 from second junction between parting resistors 18 and 19 so that operational amplifier 20 produces an error voltage between sensed voltage and reference voltage $V_{R1}$ from output terminal. Error voltage from output terminal of operational amplifier 20 provides a control signal for constant current which flows through light emitter 26, diode 22 and resistor 21 to form a logical sum signal in cooperation with a control signal for constant voltage produced from voltage control operational amplifier 14. Accordingly, when DC output current $I_O$ toward load 50 exceeds the rated value $I_{OMAX}$ so that detection voltage by detecting resistor 17 is above reference voltage $V_{R1}$ on second junction between parting resistors 18 and 19, current control operational amplifier 20 generates a negative error voltage to reduce the on-period of MOS-FET 5. Consequently, DC output voltage $V_O$ rapidly drops while DC output current $I_O$ through load 50 is maintained on a constant level $I_{OMAX}$ as shown by solid line B in FIG. 7, indicating the constant current output characteristics. A typical example of such a DC power source device is disclosed by Japanese Patent No. 3,099,763.

Meanwhile, DC power source device shown in FIG. 6 is defective in that it cannot supply shunt regulator 24 with minimum drive current $I_{SH}$ necessary to keep reference voltage $V_{REF}$ on a constant level when DC output voltage $V_o$ declines to a lower voltage VI because resistance value of bias resistor 23 is determined to supply shunt regulator 24 with drive current $I_{SH}$ of a necessary minimum value when DC output voltage $V_O$ is on the constant value $V_2$. As a result, when DC output voltage $V_O$ drops as shown by solid line B in FIG. 7, shunt regulator 24 fluctuates reference voltage $V_{REF}$, and therefore, disadvantageously changes DC output current $I_O$. On the contrary, if bias resistor 23 is set to a low resistance value to supply shunt regulator 24 with drive current $I_{SH}$ of necessary minimum value when DC output voltage $V_O$ falls to lower voltage $V_1$, a large electric current runs through bias resistor 23 when DC output voltage $V_O$ is of constant value $V_2$, thereby inconveniently causing increase in power loss across bias resistor 23. As power loss across bias resistor 23 is indicated by seeking the square of potential difference between voltages $V_1$ and $V_2$ and then dividing the square by resistance value of bias resistor 23, the power loss increases with the greater difference between voltages $V_1$ and $V_2$. During the load standby mode such as under the unloaded or light-loaded condition, the power source device increases the ratio of power loss across bias resistor 23 to the whole power loss so that increased power loss with bias resistor 23 is a serious hindrance against improvement in conversion efficiency during the load standby mode. In this manner, control circuit 9 unfavorably and rapidly increases a rate of consumed power in the load standby mode.

It is therefore an object of the present invention to provide a DC power source device which supplies a reference voltage source with necessary minimum drive current in case of the lowered output voltage, and controls drive current for the reference voltage source to a necessary minimum level in case of the rated output to reduce electric power consumed by the control circuit in the load standby mode such as under unloaded or light-loaded condition.

SUMMARY OF THE INVENTION

The DC power source device according to the present invention comprises at least one switching element (5) which performs the intermittent switching operation for converting DC input from a DC power supply (1) into high frequency electric power; a control circuit (9) for turning switching element (5) on and off; and a rectifying smoother (6) for converting the high frequency electric power through switching element (5) into a DC power output supplied to a load (50). Control circuit (9) comprises an output current controller (11) for controlling the on-off term of switching element (5) to make DC output current ($I_O$) through load (50) settle toward a rated value ($I_{OMAX}$); a reference voltage source (24) for receiving drive current ($I_{SH}$) supplied from rectifying smoother (6) and producing a reference voltage ($V_{R1}$) to regulate the rated value ($I_{OMAX}$) of output current controller (11); and a drive current controller (31) for keeping the drive current ($I_{SH}$) through the reference voltage source (24) on a substantially constant level under the rated output condition and the reduced output voltage condition. Therefore, drive current controller (31) functions to supply reference voltage source (24) with minimum drive current ($I_{SH}$) to maintain reference voltage ($V_{REF}$) on a constant level under the reduced output voltage, and also to control drive current ($I_{SH}$) toward reference voltage source (24) to a necessary but minimum level in case of the rated output, thus, reducing power consumption in control circuit (9) during the load standby mode such as under the unloaded or light-loaded condition.

BEST MODE FOR CARRYING OUT THE INVENTION

Embodiments of the DC power source device according to the present invention are described with reference to FIGS. 1 to 5. Same symbols are applied to denote same elements in these Figures as those shown in FIG. 6, and description thereon is omitted.

Figure 4:
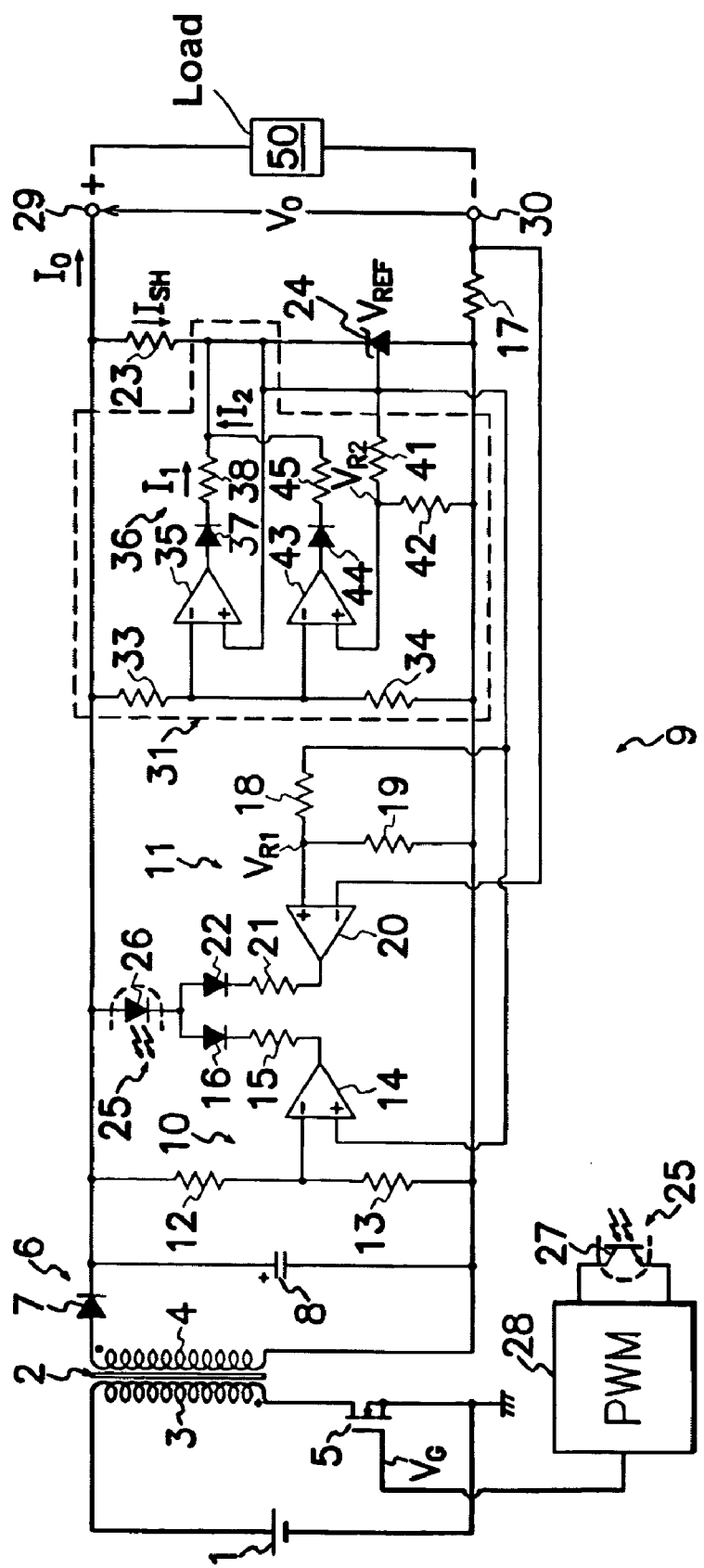
FIG. 4 is an electric circuit diagram showing a fourth embodiment of the present invention.
Figure 5:
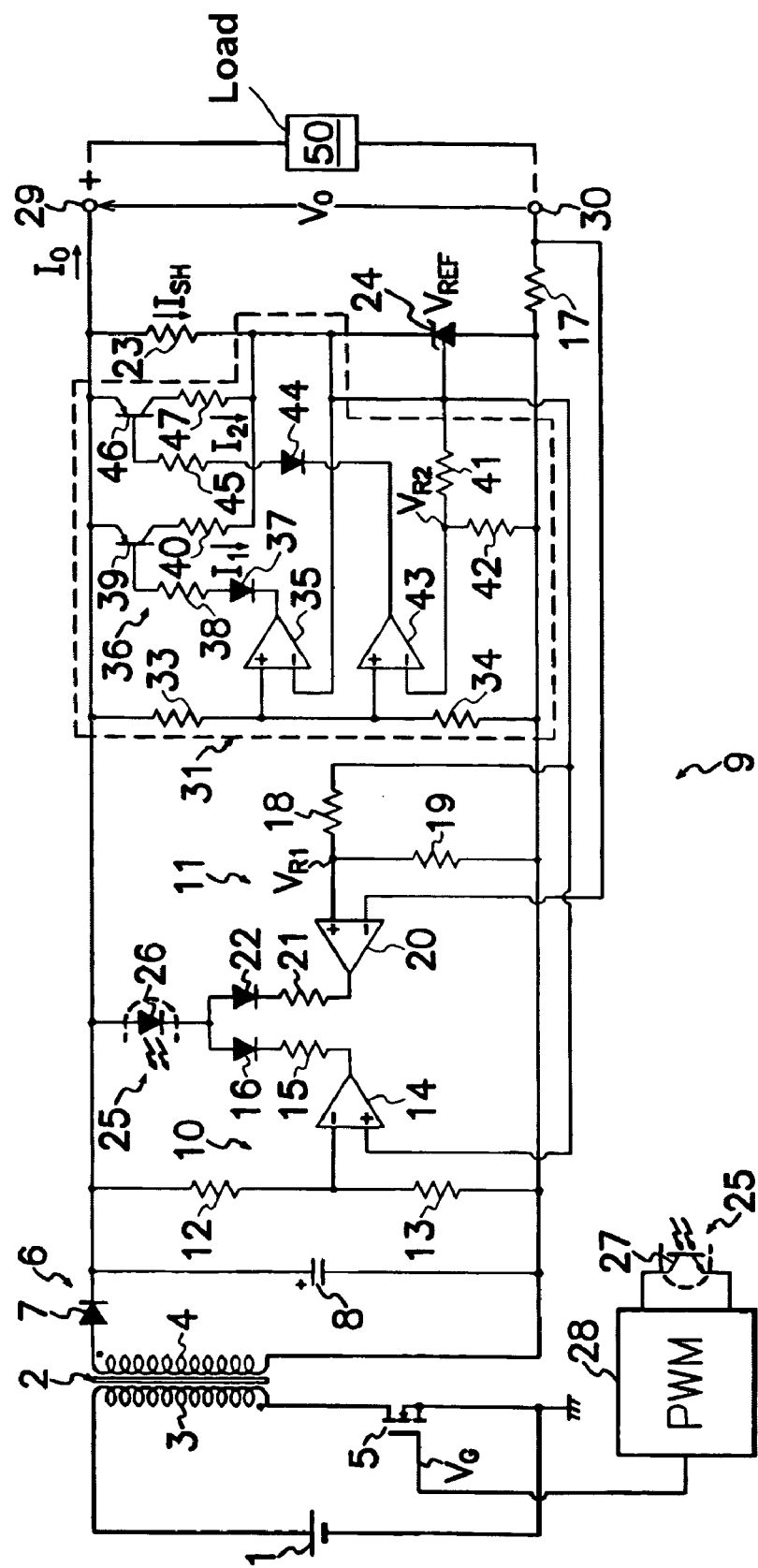
FIG. 5 is an electric circuit diagram showing a fifth embodiment of the present invention.
Figure 6:
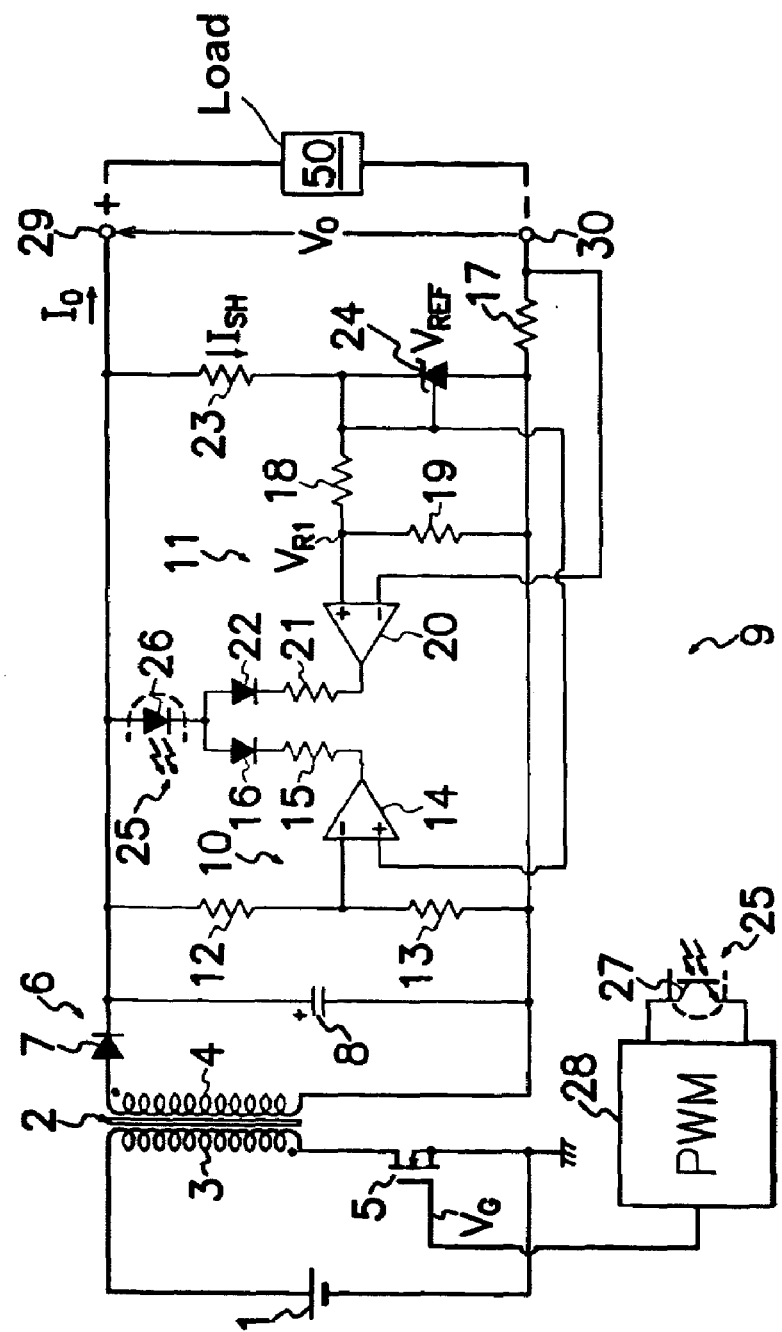
FIG. 6 is an electric circuit diagram showing a prior art DC power source device.

Each embodiment according to the present invention shown in FIGS. 1 to 5 is different from the prior art DC power source device shown in FIG. 6 in that each of the embodiments strikingly includes a drive current controller 31 in DC power source device for supplying a shunt regulator 24 with substantially constant drive current $I_{SH}$ from rectifying smoother 6. In a first embodiment shown in FIG. 1, in lieu of bias resistor 23 shown in FIG. 6, a constant current source 32 as a drive current controller 31 is connected between DC output positive terminal 29 of rectifying smoother 6 and cathode terminal of shunt regulator 24. Drive current controller 31 is operated by output current $I_{SH}$ from rectifying smoother 6 to always produce a constant current output regardless of voltage level $V_O$ of DC output from rectifying smoother 6. Constant current source 32 may be selected from for example a current mirror circuit and a constant current circuit of bipolar transistors or MOS-FETs. If constant current output from constant current source 32 is adjusted to a necessary minimum current value to keep reference voltage $V_{REF}$ from shunt regulator 24 on a constant level, constant current source 32 can always provide a constant current output for shunt regulator 24 independently from DC output voltage level $V_O$ from rectifying smoother 6. Consequently, constant current source 32 furnishes shunt regulator 24 with a substantially constant drive current $I_{SH}$ in the rated output and reduced voltage output conditions shown by respectively solid lines A and B in FIG. 7. In other words, drive current controller 31 can, not only, provide shunt regulator 24 with minimum drive current $I_{SH}$ necessary to maintain reference voltage $V_{REF}$ from shunt regulator 24 on a constant level in case of the lowered output voltage, but also control drive current $I_{SH}$ to shunt regulator 24 to a minimum but necessary level in case of the rated output. Accordingly, drive current controller 31 can minimize or keep constant power loss by drive current $I_{SH}$ through shunt regulator 24, thereby causing control circuit 9 to reduce power consumption in the load standby mode such as under the unloaded or light-loaded condition.

Figure 1:
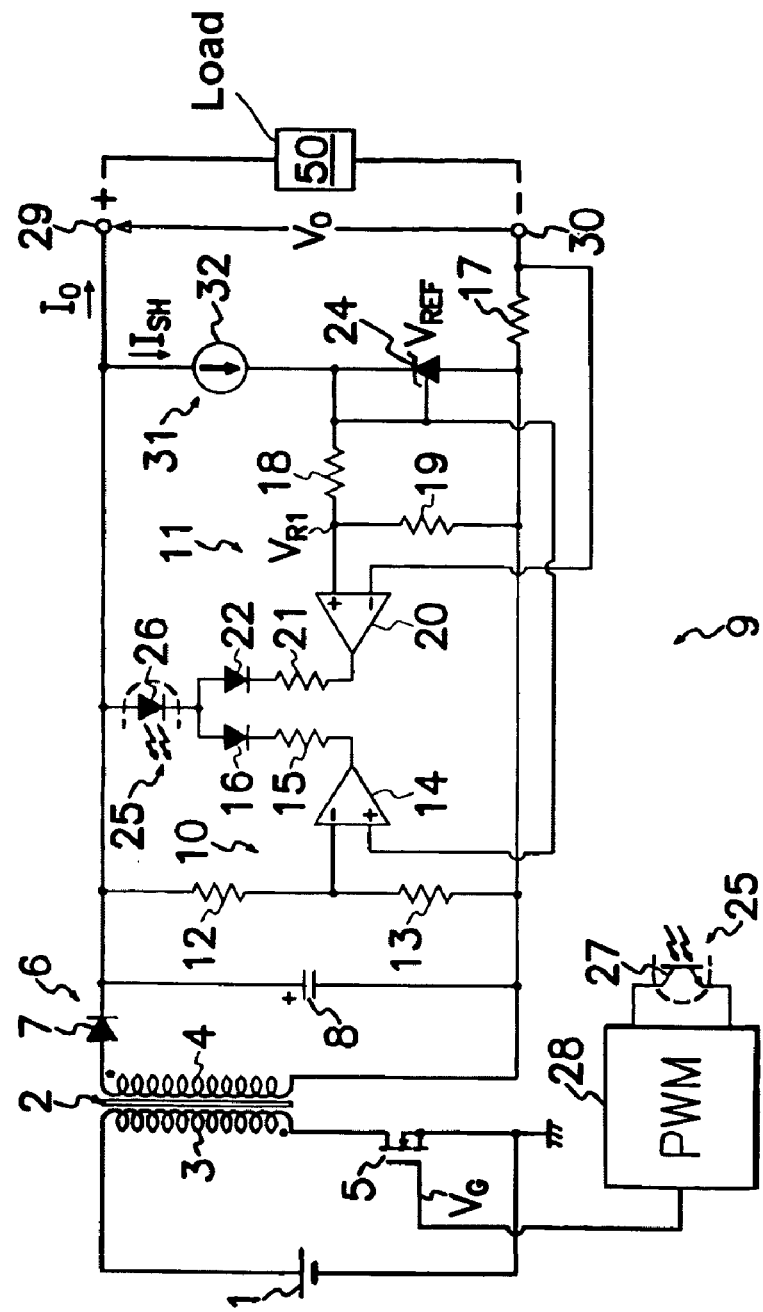
FIG. 1 is an electric circuit diagram showing a first embodiment of the DC power source device according to the present invention.
Figure 2:
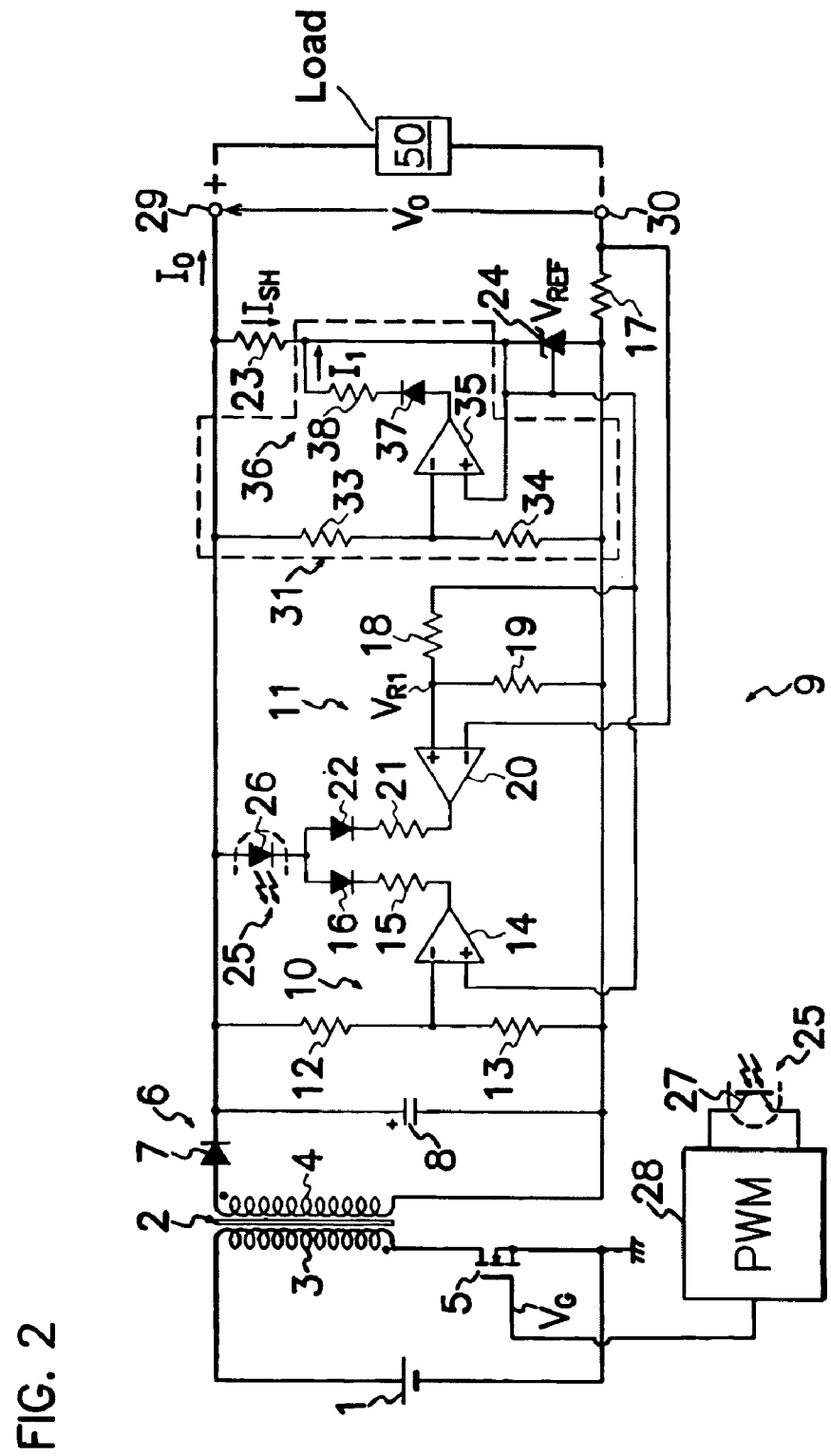
FIG. 2 is an electric circuit diagram showing a second embodiment of the present invention.

A second embodiment of the invention shown in FIG. 2 comprises a drive current controller 31 connected between bias resistor 23 and cathode terminal of shunt regulator 24 shown in FIG. 6. Drive current controller 31 comprises detecting resistors 33, 34 as an output voltage detector for dividing output voltage to detect DC output voltage $V_O$ from rectifying smoother 6; a drive current control comparator 35 as a voltage comparing means which has an inverted input terminal for receiving a voltage divided by detecting resistors 33, 34 and a non-inverted input terminal for receiving reference voltage $V_{REF}$ of shunt regulator 24 as a threshold voltage; and a current adjuster 36 which comprises a diode 37 as a rectifying element and a resistor 38 connected in series between an output terminal of control comparator 35 and cathode terminal of shunt regulator 24. Control comparator 35 produces first and second output signals of low and high voltage levels L and H when a voltage divided by detecting resistors 33, 34 is respectively higher and lower than reference voltage $V_{REF}$ of shunt regulator 24. Current adjuster 36 is designed to supply shunt regulator 24 with only drive current $I_{SH}$ from rectifying smoother 6 when control comparator 35 produces output signal of low voltage level, and otherwise to supply auxiliary drive current $I_1$ for shunt regulator 24 through diode 37 and resistor 38 in addition to drive current $I_{SH}$ when control comparator 35 produces a different output signal of high voltage level.

Figure 7:
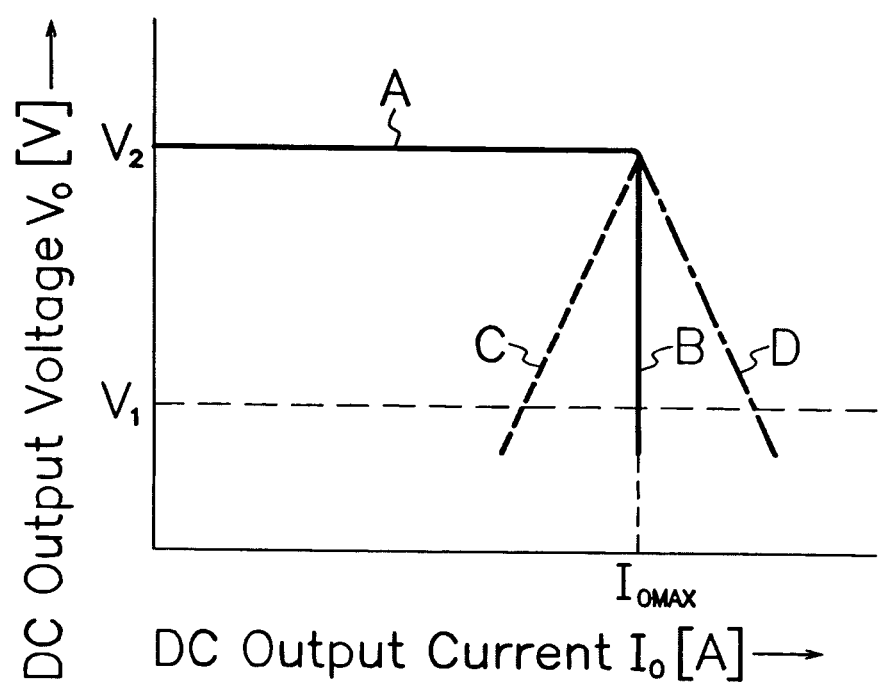
FIG. 7 is a graph showing an output drooping characteristics of DC power source device.

When DC output voltage $V_O$ from rectifying smoother 6 is controlled at the rated constant value $V_2$ as shown by solid line A of FIG. 7, voltage divided by detecting resistors 33, 34 is higher than reference voltage $V_{REF}$ of shunt regulator 24 so that control comparator 35 produces output signal of low voltage level L. This turns diode 37 of current adjuster 36 off to supply drive current $I_{SH}$ alone from rectifying smoother 6 through bias resistor 23 toward shunt regulator 24. When DC output voltage $V_O$ from rectifying smoother 6 rapidly drops to or less than a level $V_1$ so that voltage divided by detecting resistors 33, 34 is lower than reference voltage $V_{REF}$ of shunt regulator 24 as shown by solid line B of FIG. 7, control comparator 35 produces an output signal of high voltage level H to turn diode 37 on so that auxiliary drive current $I_1$ flows from control comparator 35, diode 37, resistor 38, and then is added or superimposed on drive current $I_{SH}$ from rectifying smoother 6 through bias resistor 23 to form a merger of drive current $I_{SH}$ and auxiliary drive current $I_1$ through shunt regulator 24. Accordingly, if the sum of drive current $I_{SH}$ and auxiliary drive current $I_1$ produced when diode 37 is in the on or conductive condition is equal to a value of drive current $I_{SH}$ flowing through bias resistor 23 from rectifying smoother 6 when diode 37 is in the off or non-conductive condition, a substantially constant drive current $I_{SH}$ can flow through shunt regulator 24 from rectifying smoother 6 throughout the rated output and reduced output voltage conditions shown by solid lines A and B of FIG. 7.

In the embodiment shown in FIG. 2, sufficiently high resistance value of bias resistor 23 can minimize power loss in shunt regulator 24 under the rated output condition. Also, the sum of drive current $I_{SH}$ from rectifying smoother 6 through bias resistor 23 and auxiliary drive current $I_1$ from control comparator 35 through diode 37 and resistor 38 under the reduced output voltage condition, can provide shunt regulator 24 with minimum drive current $I_{SH}$ necessary to maintain reference voltage $V_{REF}$ of shunt regulator 24 on a constant level. Therefore, the embodiment of FIG. 2 can accomplish minimized power loss in shunt regulator 24 by drive current $I_{SH}$, and diminish power consumption in control circuit 9 in the load standby mode such as under unloaded or light-loaded condition.

Figure 3:
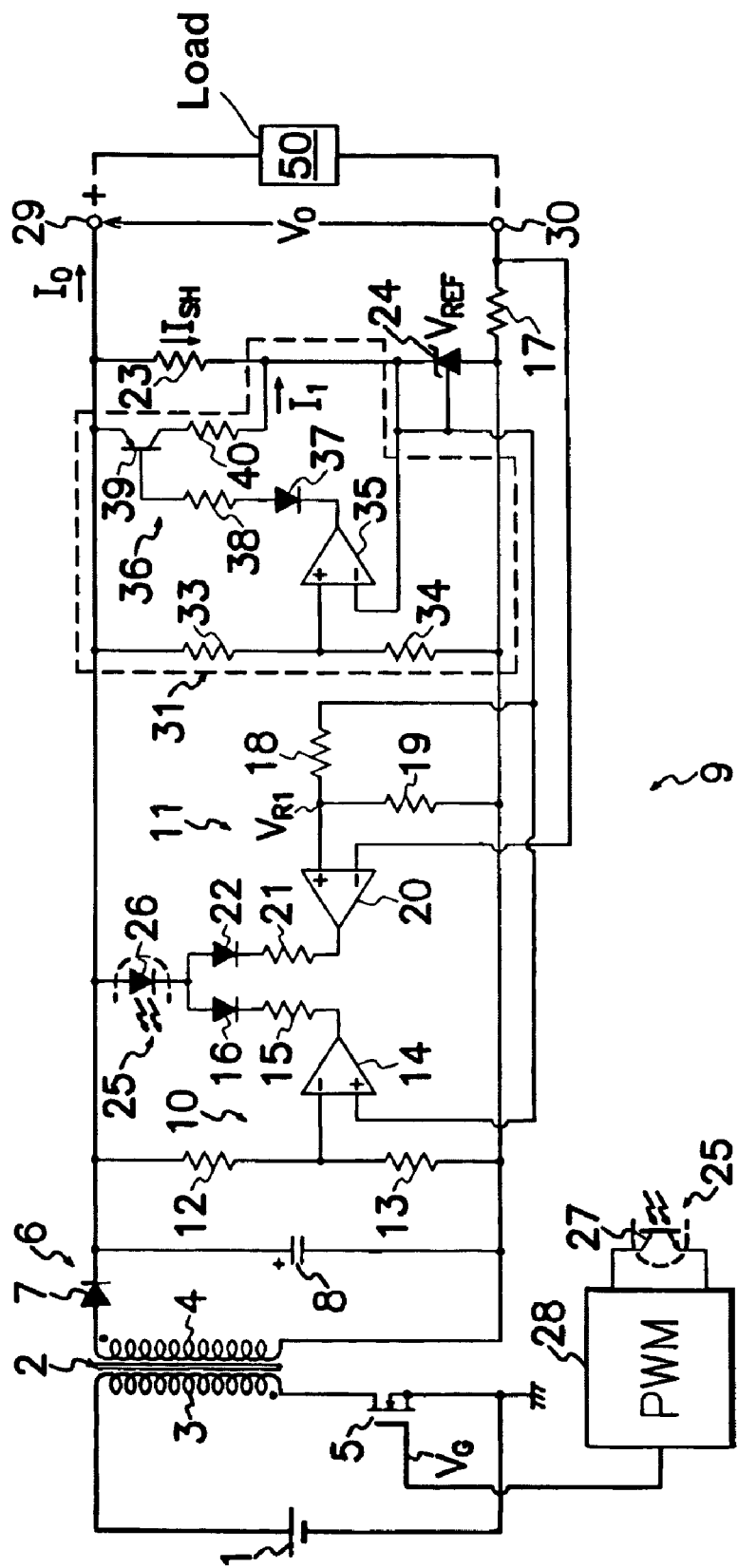
FIG. 3 is an electric circuit diagram showing a third embodiment of the present invention.

FIG. 3 represents a third embodiment according to the present invention which includes a drive current controller 31 connected between bias resistor 23 and cathode terminal of shunt regulator 24. Drive current controller 31 comprises detecting resistors 33, 34 for detecting DC output voltage $V_o$ from rectifying smoother 6; a control comparator 35; and a current adjustor 36. Control comparator 35 has a non-inverted input terminal for receiving a divided voltage from detecting resistors 33 and 34, and an inverted terminal for receiving a reference voltage $V_{REF}$ from shunt regulator 24 so that control comparator 35 produces output signals of high and low voltage levels H and L when divided voltage by detecting resistors 33, 34 is respectively higher and lower than reference voltage $V_{REF}$ from shunt regulator 24. Current adjuster 36 comprises a first series connection circuit of a PNP transistor 39 as a switch means and a resistor 40 connected to both ends of bias resistor 23, and a diode 37 as a reverse current inhibiter and a resistor 38 connected in series between an output terminal of control comparator 35 and a base terminal of PNP transistor 39. When control comparator 35 produces output signals of high voltage level H, PNP transistor 39 is turned off to supply shunt regulator 24 with drive current $I_{SH}$ alone from rectifying smoother 6 through resistor 23, adversely when control comparator 35 produces output signals of low voltage level L, PNP transistor 39 is turned on to supply shunt regulator 24 with auxiliary drive current $I_1$ through resistor 40 in addition to drive current $I_{SH}$ through resistor 23 to superimpose auxiliary drive current $I_1$ on drive current $I_{SH}$.

When DC output voltage $V_O$ from rectifying smoother 6 is controlled to the rated constant value $V_2$ shown by solid line A of FIG. 7, voltage divided by detecting resistors 33, 34 is higher than reference voltage $V_{REF}$ of shunt regulator 24 so that control comparator 35 produces an output signal of high voltage level H. At this moment, diode 37 of current adjuster 36 is biased in the adverse direction to the off or non-conductive mode, and PNP transistor 39 is turned off due to the signal of high voltage level H applied on base terminal of PNP transistor 39 to supply drive current $I_{SH}$ alone from rectifying smoother 6 through bias resistor 23 toward shunt regulator 24. Then, when DC output voltage $V_o$ from rectifying smoother 6 rapidly drops to or less than a level $V_1$ so that voltage divided by detecting resistors 33, 34 is lower than reference voltage $V_{REF}$ of shunt regulator 24 as shown by solid line B of FIG. 7, control comparator 35 produces an output signal of low voltage level L to bias diode 37 in the forward direction to the on or conductive condition, thereby causing PNP transistor 39 to be turned on with base current going through base terminal of PNP transistor 39. Accordingly, under the reduced output voltage condition, auxiliary drive current $I_1$ flows from rectifying smoother 6 through PNP transistor 39 and resistor 40 to merge into drive current $I_{SH}$ from rectifying smoother 6 through bias resistor 23 to form a sum or united drive current through shunt regulator 24. Accordingly, if the sum of drive current $I_{SH}$ through bias resistor 23 and auxiliary drive current $I_1$ through PNP transistor 39 and resistor 40 when PNP transistor 30 is in the conductive condition, is equal to a value of drive current $I_{SH}$ flowing through bias resistor 23 from rectifying smoother 6 when PNP transistor 39 is in the non-conductive condition, a substantially constant drive current $I_{SH}$ can flow through shunt regulator 24 from rectifying smoother 6 throughout the rated output and reduced output voltage conditions shown by solid lines A and B of FIG. 7.

Similarly to the embodiment shown in FIG. 2, sufficiently high resistance value of bias resistor 23 can minimize power loss through shunt regulator 24 under the rated output condition. Also, the sum of drive current $I_{SH}$ from rectifying smoother 6 through bias resistor 23 and auxiliary drive current $I_1$ through PNP transistor 39 and resistor 40 in the reduced output voltage condition, can provide shunt regulator 24 with minimum drive current $I_{SH}$ necessary to maintain reference voltage $V_{REF}$ of shunt regulator 24 on a constant level as in FIG. 2. Therefore, the embodiment in FIG. 3 can accomplish minimized power loss in shunt regulator 24 by drive current $I_{SH}$, and diminish power consumption in control circuit 9 in the load standby mode such as under the unloaded or light-loaded condition.

A DC power source device of an embodiment shown in FIG. 4 comprises a second control comparator 43, a second diode 44 and a second resistor 45 connected in series between a junction of detecting resistors 33, 34 and cathode terminal of shunt regulator 24. Also, connected between cathode terminal of shunt regulator 24 and non-inverted input terminal of second control comparator 43 are dividing resistors 41 and 42 which divide reference voltage $V_{REF}$ from shunt regulator 24 to produce a reference voltage $V_{R2}$. Second control comparator 43 has an inverted input terminal connected to junction of detecting resistors 33 and 34, and a non-inverted input terminal of second control comparator 43 from junction of dividing resistors 41 and 42 as a threshold voltage for second control comparator 43. Reference voltage $V_{R2}$ on junction of dividing resistors 41 and 42 is set to a value lower than reference voltage $V_{REF}$ from shunt regulator 24.

Under the rated output condition where DC output voltage $V_O$ from rectifying smoother 6 is controlled to a constant value $V_2$ shown by solid line A of FIG. 7, voltage divided by detecting resistors 33, 34 is higher than reference voltage $V_{REF}$ of shunt regulator 24 and reference voltage $V_{R2}$ on junction of dividing resistors 41 and 42 so that first and second control comparators 35 and 43 produce output signals of low voltage level L. At this moment, both diodes 37 and 44 of current adjuster 36 are biased in the adverse direction to the off or non-conductive mode to supply drive current $I_{SH}$ alone from rectifying smoother 6 through bias resistor 23 to shunt regulator 24.

Then, when DC output voltage $V_O$ from rectifying smoother 6 rapidly drops to or less than a level $V_1$ as shown by solid line B of FIG. 7 so that divided voltage on junction of detecting resistors 33, 34 comes to a value between reference voltage $V_{REF}$ of shunt regulator 24 and reference voltage $V_{R2}$ on junction of dividing resistors 41 and 42, first control comparator 35 produces an output signal of high voltage level H to bias diode 37 in the forward direction to the on or conductive condition, and second control comparator 43 produces an output signal of low voltage level L to bias diode 44 in the reverse direction to the off or non-conductive condition. Here, a first auxiliary drive current $I_1$ flows from first control comparator 35 through diode 37 and resistor 38 to join with drive current $I_{SH}$ flowing from rectifying smoother 6 through bias resistor 23 into a merged drive current through shunt regulator 24. When DC output voltage $V_O$ from rectifying smoother 6 further falls beneath level $V_1$ so that divided voltage on junction of detecting resistors 33, 34 descends under reference voltage $V_{R2}$ on junction of dividing resistors 41 and 42, each of first and second control comparators 35 and 43 produces an output signal of high voltage level H to bias diodes 37 and 44 in the forward direction to the on or conductive condition. Accordingly, first and second auxiliary drive currents $I_1$ and $I_2$ flow from first control comparator 35 through diode 37 and resistor 38 and from second control comparator 43 through diode 44 and resistor 45 to join with drive current $I_{SH}$ flowing from rectifying smoother 6 through bias resistor 23 into a merged drive current through shunt regulator 24.

In this way, embodiment shown in FIG. 4 enables two stage change in auxiliary drive current by separately adding auxiliary drive current $I_1$ only or $I_1$ plus $I_2$ through diodes 37 and 44 and resistors 38 and 45 of current adjuster 36 to drive current $I_{SH}$ through shunt regulator 24 in response to voltage level on junction of detecting resistors 33 and 34, thereby resulting in accurate adjustment of drive current to shunt regulator 24 in response to drop of DC output voltage $V_O$ from rectifying smoother 6.

Now referring to FIG. 5, a fifth embodiment according to the present invention is shown which comprises a plurality of switch means, namely a second series connection circuit of a PNP transistor 46 and a resistor 47 connected in parallel to first series connection circuit of PNP transistor 39 and resistor 40; and a further series circuit of a control comparator 43, a diode 44 and a resistor 45 connected between junction of detecting resistors 33 and 34 and base terminal of PNP transistor 46. Dividing resistors 41 and 42 are connected between a cathode terminal of shunt regulator 24 and inverted input terminal of second control comparator 43 to produce a reference voltage $V_{R2}$ on junction between dividing resistors 41 and 42 by dividing reference voltage $V_{REF}$ from shunt regulator 24. Similarly to the embodiment shown in FIG. 4, reference voltage $V_{R2}$ on junction between dividing resistors 41 and 42 is set to a value lower than reference voltage $V_{REF}$ from shunt regulator 24. Junction of detecting resistors 33 and 34 is connected to non-inverted terminal of second control comparator 43 whose inverted terminal is connected to junction between dividing resistors 41 and 42.

Under the rated output condition where DC output voltage $V_O$ from rectifying smoother 6 is controlled to a constant value $V_2$ shown by solid line A of FIG. 7, voltage divided by detecting resistors 33, 34 is higher than reference voltage $V_{REF}$ of shunt regulator 24 and reference voltage $V_{R2}$ on junction of dividing resistors 41 and 42 so that first and second control comparators 35 and 43 produce output signals of low voltage level L. At this moment, both diodes 37 and 44 of current adjuster 36 are biased in the adverse direction to the off or non-conductive mode to supply drive current $I_{SH}$ alone from rectifying smoother 6 through bias resistor 23 to shunt regulator 24.

Then, when DC output voltage $V_O$ from rectifying smoother 6 rapidly drops to or less than a level $V_1$ as shown by solid line B of FIG. 7 so that divided voltage on junction of detecting resistors 33, 34 comes to a value between reference voltage $V_{REF}$ of shunt regulator 24 and reference voltage $V_{R2}$ on junction of dividing resistors 41 and 42, first control comparator 35 produces an output signal of low voltage level L to bias diode 37 in the forward direction to the on or conductive condition, and second control comparator 43 produces an output signal of high voltage level H to bias diode 44 in the reverse direction to the off or non-conductive condition. As low voltage signal is applied to base terminal of PNP transistor 39, first PNP transistor 39 only is turned on to pass first auxiliary drive current $I_1$ from rectifying smoother 6 through PNP transistor 39 and resistor 40, and first auxiliary drive current $I_1$ joins with drive current $I_{SH}$ flowing from rectifying smoother 6 through bias resistor 23 into a merged drive current through shunt regulator 24. When DC output voltage $V_O$ from rectifying smoother 6 further falls beneath level $V_1$ so that divided voltage on junction of detecting resistors 33, 34 descends under reference voltage $V_{R2}$ on junction of dividing resistors 41 and 42, each of first and second control comparators 35 and 43 produces an output signal of low voltage level L to bias diodes 37 and 44 in the forward direction to the on or conductive condition, thereby causing first and second PNP transistors 39 and 46 to be turned on. Accordingly, first and second auxiliary drive currents $I_1$ and $I_2$ flow from rectifying smoother 6 through PNP transistors 39 and 46, resistors 40 and 47 to both join with drive current $I_{SH}$ flowing from rectifying smoother 6 through bias resistor 23 into a merged drive current through shunt regulator 24.

In this way, the embodiment shown in FIG. 5 enables two stage change in auxiliary drive current by turning on one or both of PNP transistors 39 and 46 of current adjuster 36 in response to voltage level on junction of detecting resistors 33 and 34 to separately add to drive current $I_{SH}$ through shunt regulator 24, auxiliary drive current $I_1$ only or $I_1$ plus $I_2$ through PNP transistors 39 and 46 and resistors 40 and 47 of current adjuster 36, thereby resulting in accurate adjustment of drive current through shunt regulator 24 in response to drop of DC output voltage $V_O$ from rectifying smoother 6.

The foregoing embodiments should not restrict the present invention and may be further modified in various ways. For example, in lieu of shunt regulator 24 of reference voltage IC as a reference voltage generator, a typical Zener diode may be used to perform similar functions and take similar effects. Also, FIGS. 4 and 5 disclose the embodiments each which comprises two control comparators 35 and 43 for two stage change of auxiliary drive currents toward shunt regulator 24 in response to drop of DC output voltage $V_O$, however, they may comprise three or more control comparators for more accurate multistage change of auxiliary drive currents for shunt regulator 24. Moreover, NPN transistors, p-channel or n-channel MOS-FETs may be used in place of PNP transistors 39 and 46 as switch means in the embodiments shown in FIGS. 3 and 5. In this case, non-inverted and inverted input terminals are adversely provided in control comparators 35 and 43 with diodes 37 and 44 of reversed polarity. Also, although the foregoing embodiments according to the present invention are applied to control circuits which indicate the constant current drooping characteristics as shown by solid line B of FIG. 7, the present invention would be able to apply to control circuits which indicate the fold-back current or constant power drooping characteristics as shown by dotted line C or alternate long and short dash line D of FIG. 7.

INDUSTRIAL APPLICABILITY

The DC power source device according to the present invention is applicable to DC-DC converters of flyback, forward, bridge, push-pull and current resonance types, an electrical isolation type which has a transformer with isolated input and output, non-isolated booster or step-down chopper type.

The invention claimed is:

1. A DC power source device comprising at least one switching element which performs the intermittent switching operation for converting DC power input from a DC power supply into high frequency electric power; a control circuit for turning the switching element on and off; and a rectifying smoother for converting the high frequency electric power through the switching element into a DC power output supplied to a load;

the control circuit comprising an output current controller for controlling the on-off term of the switching element to make DC output current through the load settle toward a rated value; a reference voltage source for receiving drive current supplied from the rectifying smoother and producing a reference voltage to regulate the rated value of the DC output current determined by the output current controller; and a drive current controller for keeping the drive current through the reference voltage source on a substantially constant level.

2. The DC power source device of claim 1, wherein the output current controller comprises a current detector for detecting DC output current through the load; a comparator for comparing detection output from the current detector and the reference voltage from the reference voltage source to produce a first or second output signal when the current detector produces the detection output respectively lower or higher than the reference voltage of the reference voltage source; and a drive signal generator for producing drive signals to control the on-off period of the switching element so as to make the DC output voltage supplied to the load settle toward a constant value or decline when the comparator produces respectively the first or second output signal.

3. The DC power source device of claim 2, wherein the drive current controller comprises an output voltage detector for detecting output voltage from the rectifying smoother; a voltage comparator for generating a first or second output signal when the output voltage detector detects the output voltage respectively higher or lower than a threshold voltage; and a current adjuster for supplying the reference voltage source with the drive current from the rectifying smoother or the drive current plus an auxiliary drive current when the voltage comparator produces respectively the first or second output signal.

4. The DC power source device of claim 3, wherein the current adjuster comprises a rectifying element and a resistor connected in series between the voltage comparator and the reference voltage source to supply the auxiliary drive current through the rectifying element and the resistor to the reference voltage source.

5. The DC power source device of claim 3, wherein the current adjuster comprises a means for preventing reverse current flow.

6. The DC power source device of claim 3, wherein the drive current controller comprises a plurality of voltage comparators which are assigned threshold voltage values different from each other to change the value of the auxiliary drive current supplied to the reference voltage source through the current adjuster by second output signals generated from the voltage comparators.

7. The DC power source device of claim 6, wherein each voltage comparator is connected in series to the reference voltage source (24) through rectifying elements and resistors; and the current adjuster supplies the reference voltage source with different drive currents when each of the voltage comparators produces the second output signal.

8. The DC power source device of claim 6, wherein the current adjuster comprises a plurality of switch means each which is turned on when the voltage comparators produce the second output signals to supply the reference voltage source with the different drive currents.

9. The DC power source device of claim 8, wherein the current adjuster comprises a means for preventing reverse current flow.

10. The DC power source device of claim 6, wherein the current adjuster comprises a means for preventing reverse current flow.

11. The DC power source device of claim 3, wherein the current adjuster comprises a switch means which is turned on when the voltage comparator produces the second output signal to supply the reference voltage source with the auxiliary drive current.

12. The DC power source device of claim 11, wherein the current adjuster comprises a means for preventing reverse current flow.

* * * * *

UNITED STATES PATENT AND TRADEMARK OFFICE
CERTIFICATE OF CORRECTION

| | | |
|---|---|---|
| PATENT NO. | : 7,239,533 B2 | Page 1 of 1 |
| APPLICATION NO. | : 10/538386 | |
| DATED | : July 3, 2007 | |
| INVENTOR(S) | : Yukinari Fukumoto et al. | |

It is certified that error appears in the above-identified patent and that said Letters Patent is hereby corrected as shown below:

Col. 12, Claim 7, line 3, "(24)" should be deleted.

Signed and Sealed this

Eighteenth Day of December, 2007

JON W. DUDAS
*Director of the United States Patent and Trademark Office*